United States Patent [19]
Ahmadian

[11] Patent Number: 6,055,609
[45] Date of Patent: Apr. 25, 2000

[54] APPARATUS AND METHOD FOR IMPROVING BUS USAGE IN A SYSTEM HAVING A SHARED MEMORY

[75] Inventor: Benham Ahmadian, Los Gatos, Calif.

[73] Assignee: Chips & Technologies, Inc., San Jose, Calif.

[21] Appl. No.: 08/878,542

[22] Filed: Jun. 19, 1997

[51] Int. Cl.[7] .......................... G06F 12/06; G11C 11/401
[52] U.S. Cl. .......................... 711/147; 711/105; 711/150
[58] Field of Search ..................... 711/106, 104, 711/105, 151, 158, 147, 150; 395/855, 848, 842, 287, 837, 838, 840; 365/189.03; 710/17, 18, 20, 22, 28, 45, 107

[56] References Cited

U.S. PATENT DOCUMENTS

| | | | |
|---|---|---|---|
| 4,630,193 | 12/1986 | Kris | 364/200 |
| 4,797,850 | 1/1989 | Amitai | 364/900 |
| 4,985,871 | 1/1991 | Catlin | 365/230.06 |
| 4,987,529 | 1/1991 | Carft et al. | 364/200 |
| 5,265,231 | 11/1993 | Nuwayser | 711/106 |
| 5,438,666 | 8/1995 | Craft et al. | 711/106 |
| 5,469,577 | 11/1995 | Eng et al. | 395/855 |
| 5,579,492 | 11/1996 | Gay | 395/287 |
| 5,729,709 | 3/1998 | Harness | 395/855 |
| 5,737,584 | 4/1998 | Moyer | 711/106 |
| 5,745,913 | 4/1998 | Pattin et al. | 711/105 |
| 5,835,733 | 11/1998 | Walsh et al. | 395/281 |
| 5,893,158 | 4/1999 | Furuta | 711/105 |

*Primary Examiner*—Eddie P. Chan
*Assistant Examiner*—Yamir Encarnacion
*Attorney, Agent, or Firm*—D'Alessandro & Ritchie

[57] ABSTRACT

A circuit suitable for use in electronic systems which utilize Synchronous Dynamic Random Access Memory (SDRAM), and method according to the present invention comprises an application-specific integrated circuit. When a burst command is initiated by the memory controller, causing the SDRAM to perform a data transfer into or out of memory which require many consecutive clock cycles to complete, the circuit recognizes the SDRAM commands as those commands appear on the instruction bus. The circuit then analyzes other operations which are pending and which might be performed during otherwise unusable time periods while the burst operation is being performed by the SDRAM. The circuit issues instructions to initiate and complete these operations prior to the SDRAM command being completed.

12 Claims, 3 Drawing Sheets

ововATUS AND METHOD FOR
APPARATUS AND METHOD FOR IMPROVING BUS USAGE IN A SYSTEM HAVING A SHARED MEMORY

BACKGROUND OF THE INVENTION

1. Field of the Invention

The present invention relates to electronic systems containing synchronous dynamic random access memory. More particularly, this invention relates to a method and apparatus for improving bus usage between memory components and other devices thus allowing for increased line of communication or transfer of data, commands, status, or any other electronic messages during previously unusable clock cycle periods.

2. The Background Art

In computer systems, calculators, televisions, electronic instruments, and other electronic devices, it is usually critical that system resources be used as efficiently as possible so that maximum efficiency may be obtained.

In systems utilizing Synchronous Dynamic Random Access Memory (SDRAM) for data storage, burst transfer modes are often utilized which allow SDRAM components to initiate access to and transfer of single or multiple blocks of data with a single command. Once a burst command is issued by the memory controller, the data is transferred over data lines between the memory controller and SDRAM as one continuous stream. It will be evident that, although the use of SDRAM components may improve system performance, further gains may be obtained through the use of the present invention.

FIG. 1 is a block diagram depicting a typical prior art interface between a memory controller and SDRAM components.

Referring to FIG. 1, memory controller 10 receives instructions from other system components over lines 12. These other system components may be graphics controllers, audio controllers, or any other system component requiring the use of SDRAM components for storage of data. These other system components may or may not be embedded within the same ASIC or part of the same system as the memory controller. In general, the term memory controller refers to circuitry which interfaces with memory, which, in this case, is SDRAM.

After receiving instructions to store or retrieve data, memory controller 10 communicates with SDRAM memory 14 using many different lines: Row Address Strobe (RAS) 16, Column Address Strobe (CAS) 18, Address lines 20, Data lines 22, write enable lines 24, and chip select lines 26. Memory 14 comprises one or more SDRAM memory components arranged so as to be addressed as an array of memory cells.

A periodic pulse is supplied to the system on Clock (CLK) line 28 which is necessary for synchronization between the various components of the system. This periodic pulse may be supplied by the memory controller or any other suitable source as is well known in the art.

Once memory controller 10 has issued a valid data transfer command to SDRAM memory 14, data begins to flow into or out of SDRAM memory 14 using data lines 22 through memory controller. The source or destination of this data may either be inside or outside of the system.

Where necessary, the memory controller may terminate any transfer already in progress. After the last byte of the requested block of data has been transmitted, another command to read or write additional blocks of data may be issued.

While this method of utilizing SDRAM components may be suitable for its intended purposes, RAS 16, CAS 18, address lines 20, and write enable lines 24 remain idle during the data transfer between SDRAM memory 14 and memory controller 10, typically between two and ten clock cycles. If these lines were able to be utilized for other purposes such as to transfer blocks of data between other system components, system performance would increase by making more efficient use of system resources. It would therefore be beneficial to provide an apparatus and method for managing the use of these idle lines while burst data transfers are taking place.

OBJECTS AND ADVANTAGES OF THE INVENTION

It is an object and advantage of the present invention to provide an apparatus and method for selectively authorizing the use of RAS, CAS, Address, Write Enable, and other interconnect lines connecting memory controller and SDRAM memory during periods where SDRAM burst operations are utilized.

These and many other objects and advantages of the present invention will become apparent to those of ordinary skill in the art from a consideration of the drawings and ensuing description of the invention.

SUMMARY OF THE INVENTION

A memory subsystem for use in electronic systems which utilize Synchronous Dynamic Random Access Memory (SDRAM), comprises a memory controller, and one or more SDRAM memory components which are coupled to and communicate with the memory controller using address lines, data lines, and various control lines. A secondary task manager is also coupled to said memory controller and the SDRAM through the address lines, data lines, and various control lines as necessary.

The secondary task manager (STM) is responsible for identifying when a burst mode data transfer has been initiated by the memory controller and then determining if the duration of the execution of that command is sufficient to allow other operations to take place which use bus lines not required for that particular transfer. In one embodiment of the present invention, the STM comprises an application-specific integrated circuit. In another embodiment, the STM may comprise discrete electronic components. In a third embodiment the STM may comprise standard components such as commonly available memory controllers and user programmable components or a combination of any or all of the types of circuits described above.

When a burst command is initiated by a memory controller, causing the SDRAM to transfer data into or out of memory using data lines, the smart controller analyzes other operations which are pending and which might be performed using otherwise idle RAS, CAS, address and write enable lines. The smart controller issues instructions to initiate and complete these operations during periods when the desired lines are available.

DESCRIPTION OF THE PREFERRED EMBODIMENT

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
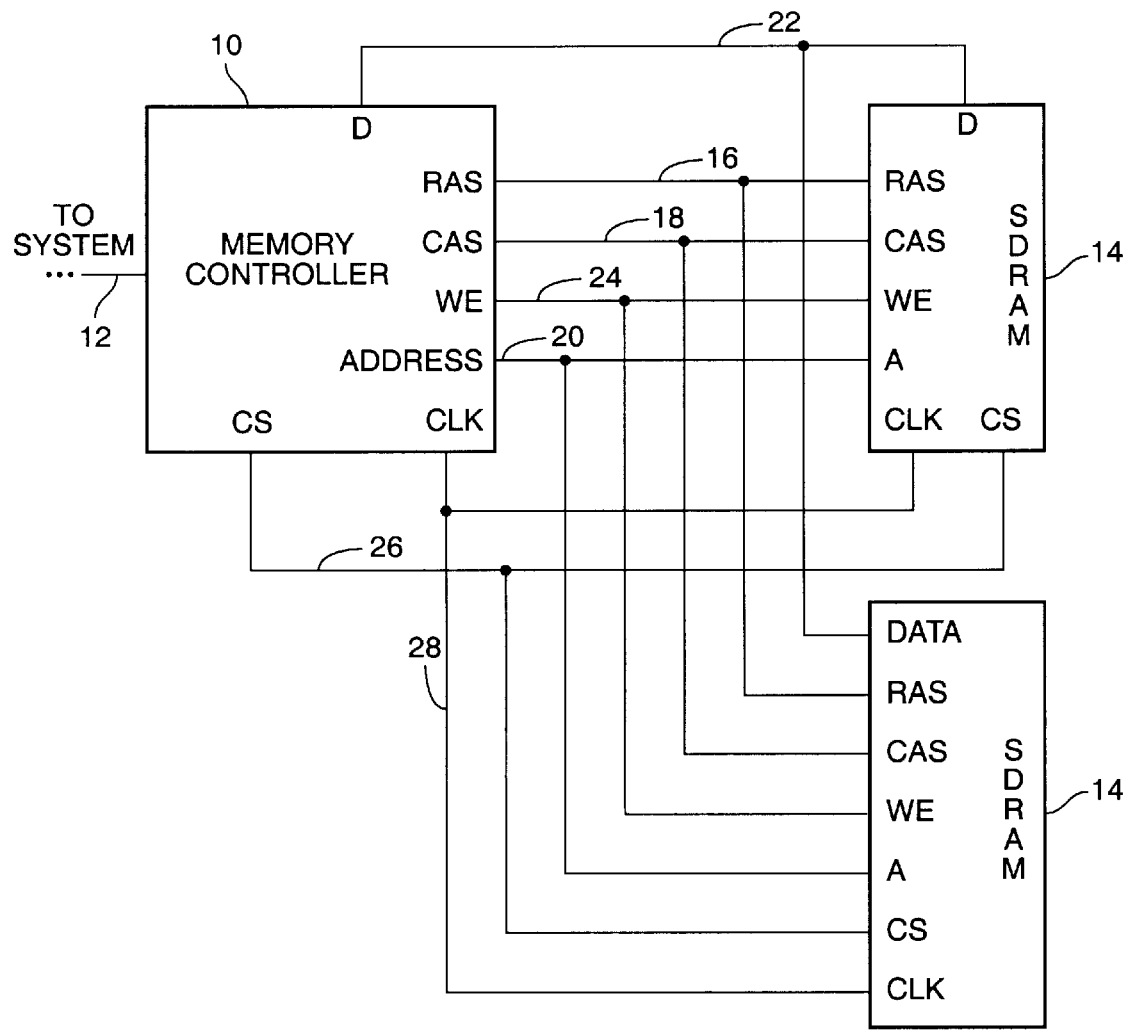
FIG. 1 is a block diagram depicting a typical prior art interface between a memory controller and SDRAM components.
Figure 2:
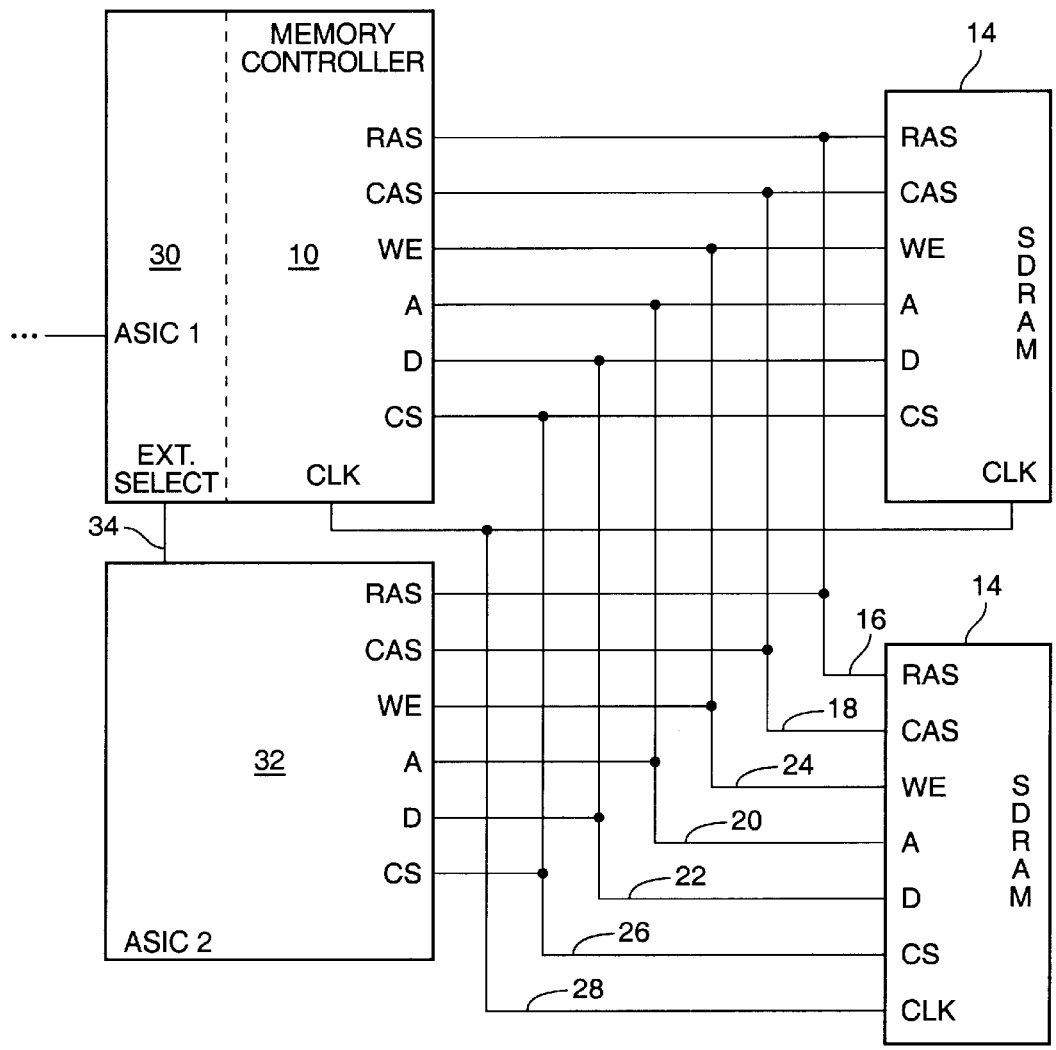
FIG. 2 is a block diagram depicting a presently preferred embodiment of the present invention.

FIG. 2 is a block diagram of a presently preferred embodiment of the present invention.

Where appropriate, FIG. 2 utilizes the same reference numerals as used in FIG. 1. These same reference numerals are intended to designate functionally equivalent features in both figures.

Referring to FIG. 2, in a presently preferred embodiment of the present invention, a first Application-Specific Integrated Circuit (ASIC) 30 comprises a memory controller 10 and additional circuitry which may interface with other system components, such as audio circuitry, disk drive controllers, and the like.

Although the use of ASIC's is preferred when practicing the present invention, it is well-known to those of ordinary skill in the art that the invention may instead comprise discrete components, a combination of discrete components and integrated circuits, or standard components such as commonly available memory controllers and user programmable components, or a combination of any or all of the above all within the scope and spirit of the present invention.

As in the prior art, memory controller 10 shares interface lines (RAS 16, CAS 18, WE 24, address lines 20, data lines 22, etc.) with and directly controls all memory operations taking place with memory 14. However, in a presently preferred embodiment of the present invention, second ASIC 32 also shares RAS 16, CAS 18, Address lines 20, data lines 22, write enable (WE) lines 24, and chip select lines 26 with memory controller 10 and SDRAM memory 14. As in the prior art, Memory 14 comprises one or more SDRAM memory components arranged so as to be addressed as an array of memory cells.

Data lines 22 are used during burst transmissions for data transfer, and thus are not available for use during those burst transmissions. However, RAS 16, CAS 18, Address lines 20, and WE lines 24 are all available for use by first ASIC 30 and second ASIC 32 during burst mode data transfers.

Figure 3:
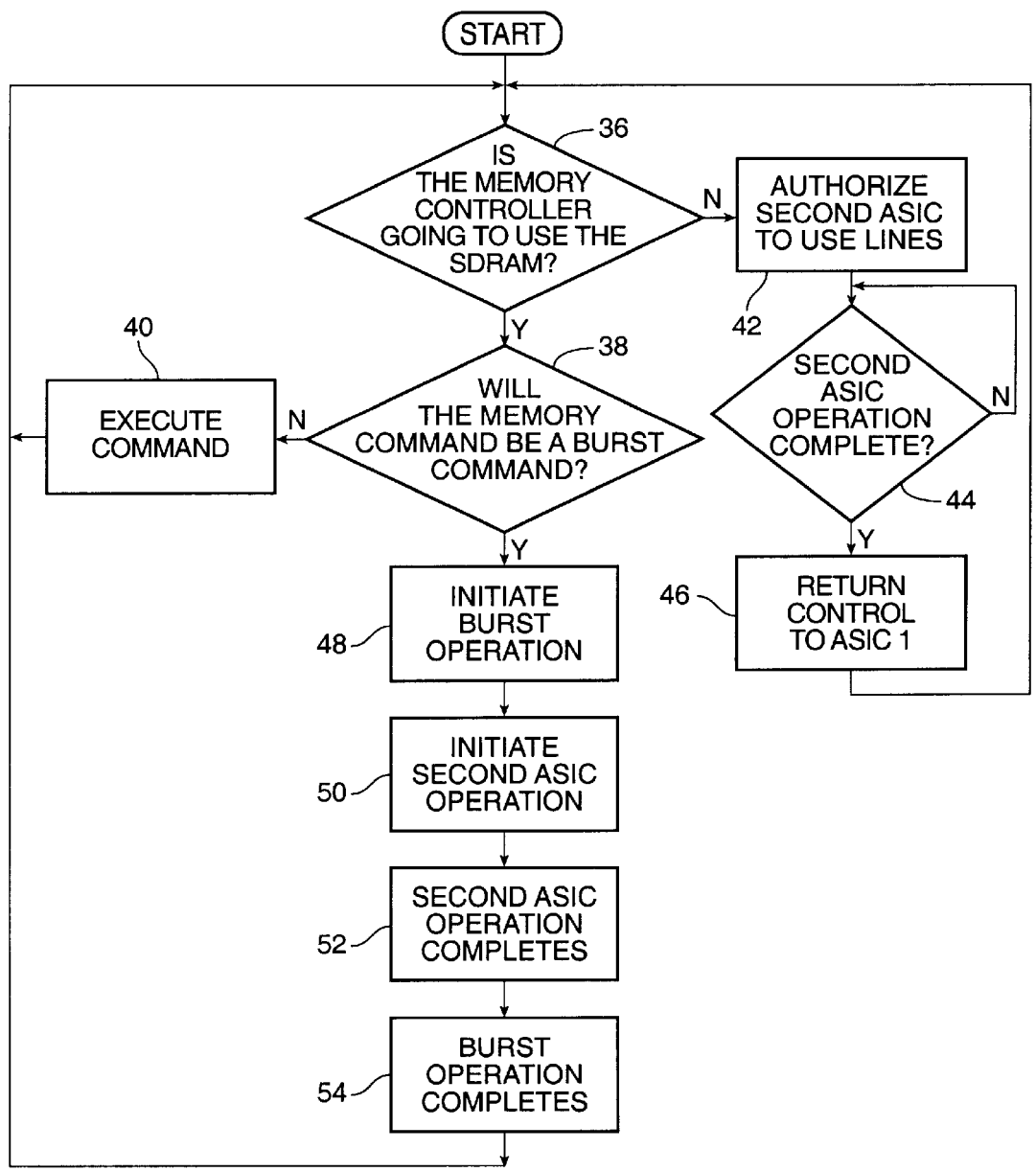
FIG. 3 is flow chart of the preferred method of managing the use of shared lines.

When appropriate in a presently preferred embodiment of the present invention (as shown in FIG. 3 to be described later), first ASIC 30 may use Ext. Select line 34 to notify second ASIC 32 that use of the lines are authorized.

Those of ordinary skill in the art will readily recognize that although a preferred method of communication between first ASIC 30 and second ASIC 32 is described, there are many ways for first ASIC 30 to signal second ASIC 32 that one or more of the common bus lines is available for use. In an alternative embodiment, direct communication between first ASIC 30 and second ASIC 32 is not required. Rather, second ASIC 32 may be designed to recognize when a burst command has been issued on the bus, and thus utilize the desired lines while the burst command is being executed.

While the illustrative includes two ASICs, those of ordinary skill in the art will recognize that the present invention is not limited to two ASICs. Examples of uses involving two devices include first ASIC 30 being implemented as a hard drive controller, and second ASIC 32 being implemented as a floppy drive controller. First ASIC 30 may also be a graphics controller and second ASIC 32 may be an audio controller. Any number of ASICs may share the interface lines. Either of first ASIC 30 or second ASIC 32 may contain the memory controller. Alternatively, the memory controller may be circuitry distinct from both ASICs.

Those of ordinary skill in the art will readily recognize that, although a presently preferred embodiment comprises SDRAM memory which utilizes burst mode data transfers, the present invention may be practiced using any type of memory which transfers large blocks of data without requiring the specific addressing of each memory segment prior to the transfer.

FIG. 3 is flow chart of the preferred method of managing the use of shared lines.

Referring to FIG. 3, the method begins at step 36 when first ASIC 30 determines if a memory operation is required. If yes, it is then determined at step 38 if a burst operation is required. If a burst operation is not required, it is expected that the idle time for address lines 20, RAS 16, CAS 18, WE lines 24, etc. will be very short, and therefore, no secondary operations are contemplated to be executed. Next, the method proceeds to step 40 where the memory command is executed on its own. The method then proceeds again to step 36.

If, at step 36, it is determined that no memory operations are required but operations involving second ASIC 32 are required, first ASIC 30 may authorize second ASIC 32 the use of the common lines at step 42, and thus perform whatever operations are pending. For instance, a transfer of audio data may be required which will require a small number of clock cycles to perform. No memory operations are contemplated, so first ASIC 30 authorizes second ASIC 32 to perform the data transfer with access to the address and control lines being guaranteed at step 44 until the operation is completed. In this case, since data is not being transferred into or out of SDRAM 14, data lines 22 are available for use by either first ASIC 30 or second ASIC 32.

Once the operation involving second ASIC 32 is complete, control of RAS 16, CAS, 18, address lines 20, data lines 22, and WE lines 24 is returned at step 46 to first ASIC 30. The method then proceeds again with step 36.

If, at step 38, it was determined that a burst mode memory operation is contemplated, step 48 proceeds with memory controller 10 commanding SDRAM 14 to begin the data transfer. Nearly simultaneously, at step 50, first ASIC 30 also instructs second ASIC 32 to begin the desired operation.

At step 52, the second ASIC 32 operation completes, wherein the method proceeds with step 54 at which time the burst mode operation completes. The method then proceeds again with step 36.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A method for managing the usage of memory address lines and memory control lines in an electronic system comprising the steps of:

providing a memory manager;

providing a memory which is controlled by said memory manager via said memory address lines and said memory control lines;

providing a secondary task manager which receives one or more secondary task manager control signals from said memory manager;

causing said memory manager to issue a burst mode read command to said memory via said address lines and said control lines;

causing said memory manager to assert one or more of said secondary task manager control signals to indicate the issuance of said burst mode read command to said secondary memory manager; and causing said secondary task manager to utilize at least one line chosen from the group of lines comprising said memory address lines and said memory control lines to transfer information during the time data is being transferred between said memory and said memory manager as a result of receiving said control signal indicating said issuance of said burst mode read command.

2. The method of claim 1 wherein said memory comprises synchronous dynamic random access memory.

3. The method of claim 1 wherein said secondary task manager is an audio controller and said information is audio data.

4. The method of claim 1 wherein said secondary task manager is a graphics controller and said information is video data.

5. The method of claim 1 wherein said secondary task manager is a hard drive controller.

6. A method for managing the usage of memory address lines and memory control lines in an electronic system comprising the steps of:

providing a memory manager;

providing a memory which is controlled by said memory manager via said memory address lines and said memory control lines;

providing a secondary task manager which receives one or more secondary task manager control signals from said memory manager;

causing said memory manager to issue a burst mode write command to said memory via said address lines and said control lines;

causing said memory manager to assert one or more of said secondary task manager control signals to indicate the issuance of said burst mode write command to said secondary memory manager; and causing said secondary task manager to utilize at least one line chosen from the group of lines comprising said memory address lines and said memory control lines to transfer information during the time data is being transferred between said memory and said memory manager as a result of receiving said control signal indicating said issuance of said burst mode write command.

7. The method of claim 6 wherein said memory comprises synchronous dynamic random access memory.

8. The method of claim 6 wherein said secondary task manager is an audio controller and said information is audio data.

9. The method of claim 6 wherein said secondary task manager is a graphics controller and said information is video data.

10. The method of claim 6 wherein said secondary task manager is a hard drive controller.

11. An apparatus for managing the usage of address lines and control lines in an electronic system comprising:

a memory;

a memory manager, said memory manager communicating with a memory through the use of a plurality of lines individually chosen from the group comprising address lines, data lines, write enable lines, chip select lines, RAS lines, and CAS lines; and a secondary task manager which shares usage of said at least one of address lines, data lines, write enable lines, chip select lines, RAS lines, and CAS lines with said memory manager and said memory, said secondary task manager having the capability of recognizing burst mode data transfer commands issued by said memory manager, and utilizing at least one line chosen from the group of lines comprising address lines, write enable lines, chip select lines, RAS lines, and CAS lines during periods of time where burst mode data transfers are taking place between said memory and said memory manager.

12. A method for managing the usage of address lines and control lines in an electronic system comprising the steps of:

providing a memory manager;

providing a memory which is controlled by said memory manager;

providing a secondary task manager which recognizes when burst mode data transfer commands are issued to said memory by said memory manager;

causing said memory manager to issue a burst mode command to said memory;

causing said secondary task manager to utilize at least one line chosen from the group of lines comprising address and control lines to transfer information during the time data is being transferred between said memory and said memory manager as a result of said burst mode command being executed.

* * * * *

UNITED STATES PATENT AND TRADEMARK OFFICE
CERTIFICATE OF CORRECTION

PATENT NO. : 6,055,609
DATED : April 25, 2000
INVENTOR(S) : Behnam H. Ahmadian

It is certified that error appears in the above-identified patent and that said Letters Patent is hereby corrected as shown below:

ON THE TITLE PAGE:
In the Header, replace "Benham Ahmadian" with-- Behnam H. Ahmadian--.

Signed and Sealed this

Tenth Day of April, 2001

Attest:

NICHOLAS P. GODICI

Attesting Officer    Acting Director of the United States Patent and Trademark Office